United States Patent
Kus et al.

(10) Patent No.: US 10,352,471 B2
(45) Date of Patent: Jul. 16, 2019

(54) SOLENOID VALVE

(71) Applicant: WALBRO LLC, Tucson, AZ (US)

(72) Inventors: Dale P. Kus, Cass City, MI (US); David L. Thomas, Cass City, MI (US)

(73) Assignee: Walbro LLC, Tucson, MI (US)

( * ) Notice: Subject to any disclaimer, the term of this patent is extended or adjusted under 35 U.S.C. 154(b) by 0 days.

(21) Appl. No.: 15/461,537

(22) Filed: Mar. 17, 2017

(65) Prior Publication Data

US 2017/0184214 A1 Jun. 29, 2017

Related U.S. Application Data

(62) Division of application No. 14/896,764, filed as application No. PCT/US2014/041707 on Jun. 10, 2014, now Pat. No. 9,631,736.

(60) Provisional application No. 61/833,228, filed on Jun. 10, 2013.

(51) Int. Cl.
*F16K 31/06* (2006.01)
*F16K 27/02* (2006.01)

(52) U.S. Cl.
CPC ........ *F16K 31/0658* (2013.01); *F16K 27/029* (2013.01); *F16K 31/0651* (2013.01); *Y10T 137/0486* (2015.04); *Y10T 137/0491* (2015.04); *Y10T 137/5987* (2015.04)

(58) Field of Classification Search
CPC .... F16K 31/0658; F16K 27/029; F16K 31/06; F16K 31/0651; F16K 1/523; Y10T 137/5987; Y10T 137/0486; Y10T 137/0491

USPC ........... 251/129.15, 129.18, 129.19, 129.21, 251/284–285
See application file for complete search history.

(56) References Cited

U.S. PATENT DOCUMENTS

| | | | | |
|---|---|---|---|---|
| 3,420,260 | A | * | 1/1969 | Wisniewski ........ F16K 31/0651 137/315.03 |
| 3,469,590 | A | * | 9/1969 | Barker ................ F16K 31/0675 251/129.08 |
| 5,921,526 | A | | 7/1999 | Najmolhoda et al. |
| 5,937,887 | A | | 8/1999 | Baxter et al. |
| 5,957,161 | A | | 9/1999 | Erickson et al. |
| 6,065,734 | A | | 5/2000 | Tackett et al. |
| 6,305,662 | B1 | | 10/2001 | Parsons et al. |
| 6,405,752 | B1 | | 6/2002 | Fritsch et al. |
| 6,425,409 | B1 | * | 7/2002 | Cross ................. F16K 31/0606 137/15.18 |
| 6,546,945 | B2 | | 4/2003 | Ishigaki et al. |
| 6,739,573 | B1 | | 5/2004 | Balsdon |

(Continued)

FOREIGN PATENT DOCUMENTS

JP H06159542 6/1994

OTHER PUBLICATIONS

Written Opinion & International Search Report for PCT/US2014/041707 dated Oct. 1, 2014, 13 pages.

*Primary Examiner* — John Bastianelli
(74) *Attorney, Agent, or Firm* — Reising Ethington P.C.

(57) ABSTRACT

A solenoid valve includes a housing, a bobbin and an armature. The bobbin is received at least partially within the housing and has a body about which a coil is provided. A fluid flow path including an inlet and an outlet and a valve seat is defined by at least one of the housing or the bobbin, and the armature is moveable relative to the valve seat to control flow through the fluid flow path.

18 Claims, 11 Drawing Sheets

(56) References Cited

U.S. PATENT DOCUMENTS

| | | |
|---|---|---|
| 6,938,875 B2 * | 9/2005 | Ichinose ............. F16K 31/0665 |
| | | 251/285 |
| 7,344,119 B2 | 3/2008 | Tsuchizawa et al. |
| 7,429,006 B2 | 9/2008 | Dallmeyler |
| 7,661,654 B2 | 2/2010 | Okuda |
| 8,028,970 B2 | 10/2011 | Fukano et al. |
| 2005/0145813 A1 | 7/2005 | Kumar |
| 2012/0068096 A1 | 3/2012 | Herbert et al. |

* cited by examiner

SOLENOID VALVE

REFERENCE TO CO-PENDING APPLICATION

This application is a division of copending application, Ser. No. 14/896,764, filed on Dec. 8, 2015, which is a national phase of PCT/US2014/041707, filed Jun. 10, 2014, which claims the benefit of U.S. Provisional Application No. 61/833,228 filed Jun. 10, 2013, which is incorporated herein by reference in its entirety.

TECHNICAL FIELD

The present disclosure relates generally to a solenoid valve for fluid flow control.

BACKGROUND

Solenoid valves are used in a wide range of devices to control fluid flow. Such valves utilize an armature driven by a magnetic field selectively generated by selectively providing electric current to a coil. The valves may include many components, and especially when the components are relatively small, assembly thereof and ensuring proper position of the components may be difficult. Some solenoids are used with engine fuel system components, such as on or in a carburetor for an engine system that does not include a battery. In at least these implementations, it is desirable to reduce the current needed to drive the solenoid as the electrical energy available in such systems may be limited.

SUMMARY

In at least some implementations, a solenoid valve includes a housing, a bobbin and an armature. The bobbin is received at least partially within the housing and has a body about which a coil is provided. A fluid flow path including an inlet and an outlet and a valve seat is defined by at least one of the housing or the bobbin, and the armature is moveable relative to the valve seat to control flow through the fluid flow path.

A method of assembling a solenoid may include the steps of:
providing a bobbin;
coupling a terminal to the bobbin in a first position wherein a gap is provided between the terminal and bobbin;
providing a coil on the bobbin and having a wire connected to the terminal; and
moving the terminal to a final position relative to the bobbin which reduces or eliminates the gap and provides slack in the wire connected to the terminal. The method may further include inserting an armature through an open end of the bobbin, inserting an armature stop through said open end of the bobbin after the armature is inserted, and/or installing a cap that engages one or both of the terminals and the armature stop so that installing the cap also moves one or both of the terminals and the armature stop to their final installed position. The armature and method may provide a so-called "drop-down" installation wherein the valve components are installed in the same direction to facilitate assembly.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 26:
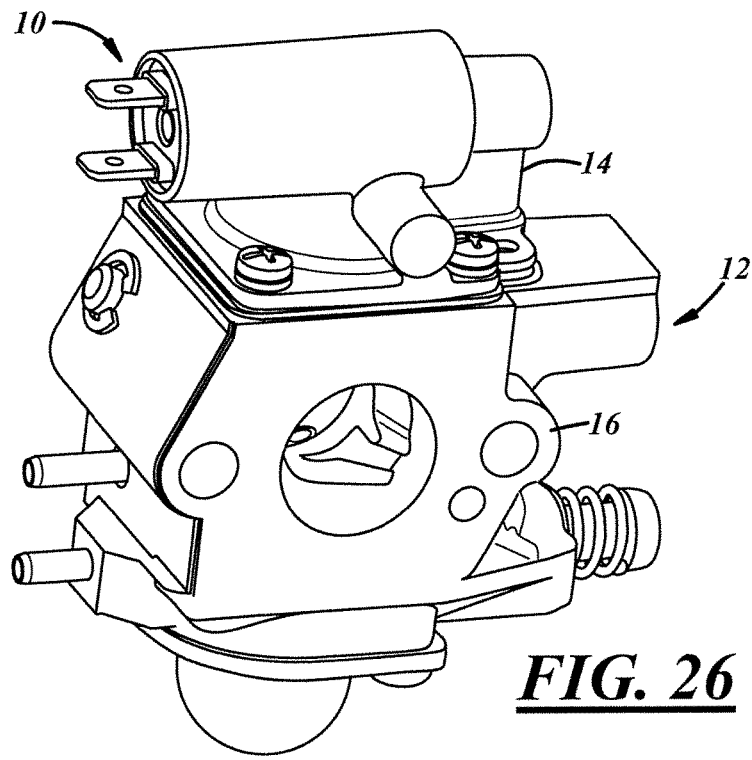
FIG. 26 is a perspective view of a carburetor including a solenoid valve as described.

Referring in more detail to the drawings, FIG. 26 illustrates a solenoid valve 10 carried by a carburetor 12 to control the flow of a fluid (e.g. gaseous, like air or liquid, like fuel) within one or more passages in the carburetor. The solenoid valve 10 may be received within a cover 14 connected to a main body 16 of the carburetor 12, or otherwise carried by or associated with the carburetor. While shown in use with a diaphragm carburetor, the solenoid valve 10 may be used with any type of carburetor or with other devices.

Figure 1:
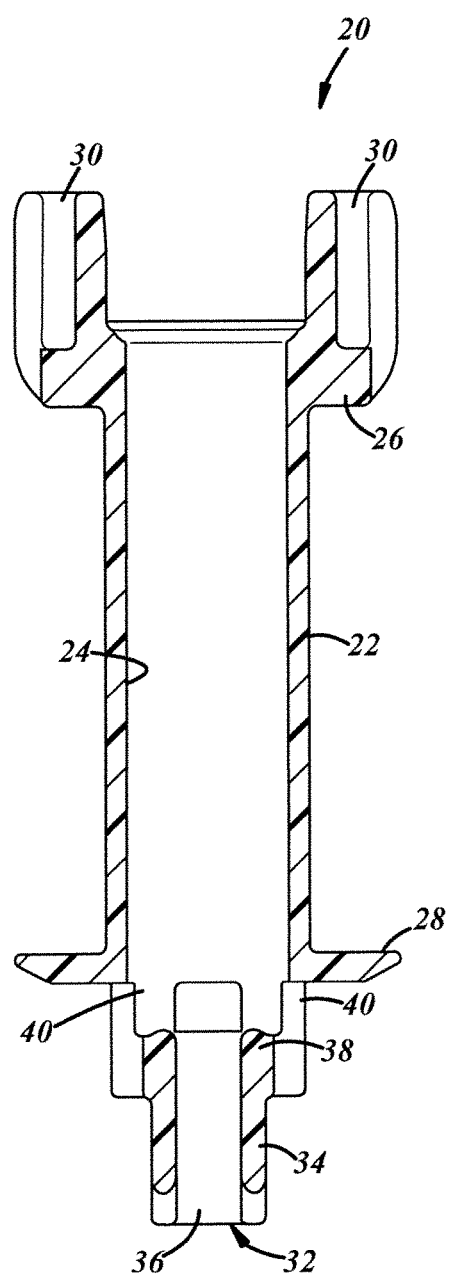
FIG. 1 is a sectional view of a bobbin.
Figure 2:
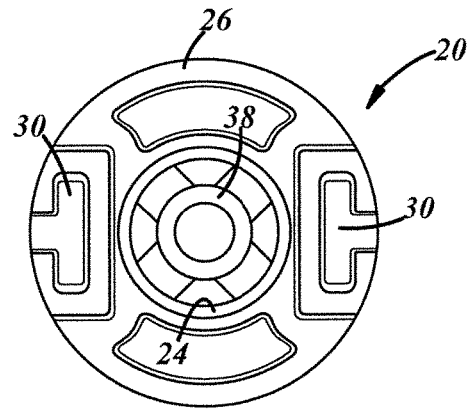
FIG. 2 is a top view of the bobbin.
Figure 3:
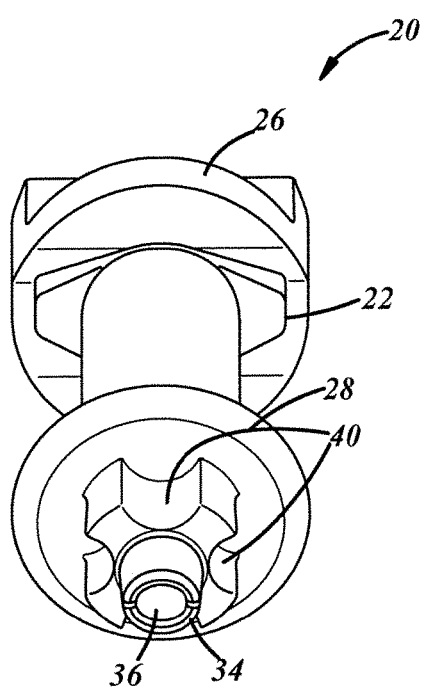
FIG. 3 is a bottom perspective view of the bobbin.

Referring to FIGS. 1-3, the solenoid valve 10 includes a bobbin 20 with a body 22 including an internal passage 24, and spaced apart and radially outwardly extending flanges 26, 28. Terminal cavities 30 may be provided extending generally axially from an upper one of the flanges 26, and a fluid flow path or passage 32 may be provided at the opposite flange 28. The fluid passage 32 may extend into and be defined at least in part by a cylindrical boss or reduced diameter portion 34 carried by the body 22. The boss may be provided adjacent to one end of the internal passage 24, opposite to an open end of the internal passage. The boss 34 is open at one end defining an inlet 36 of the passage 32 and an internal valve seat 38 is defined at its other end. Downstream of the valve seat 38, one or more fluid outlets 40 are provided in the body 22. The valve seat 38 faces the internal passage 24 and may have at least a portion that is radially smaller than the internal passage 24 (e.g. extends inwardly relative to and/or provides a shoulder in or adjacent to the internal passage), and an armature 42 (FIG. 16) received in the passage 24 may open and close, or control the opening and closing of, the valve seat 38 as the armature 42 is driven by the solenoid. In the illustrated embodiment, four outlets 40 are provided. While not required, the bobbin 20 and all of the features described above including the valve seat 38, body 22, terminal cavities 30 and fluid flow passages/ports may all be integrally provided in the same component and may be formed in the same piece of material. In at least one implementation, the bobbin is molded from a plastic material and includes all of these features as molded.

Figure 4:
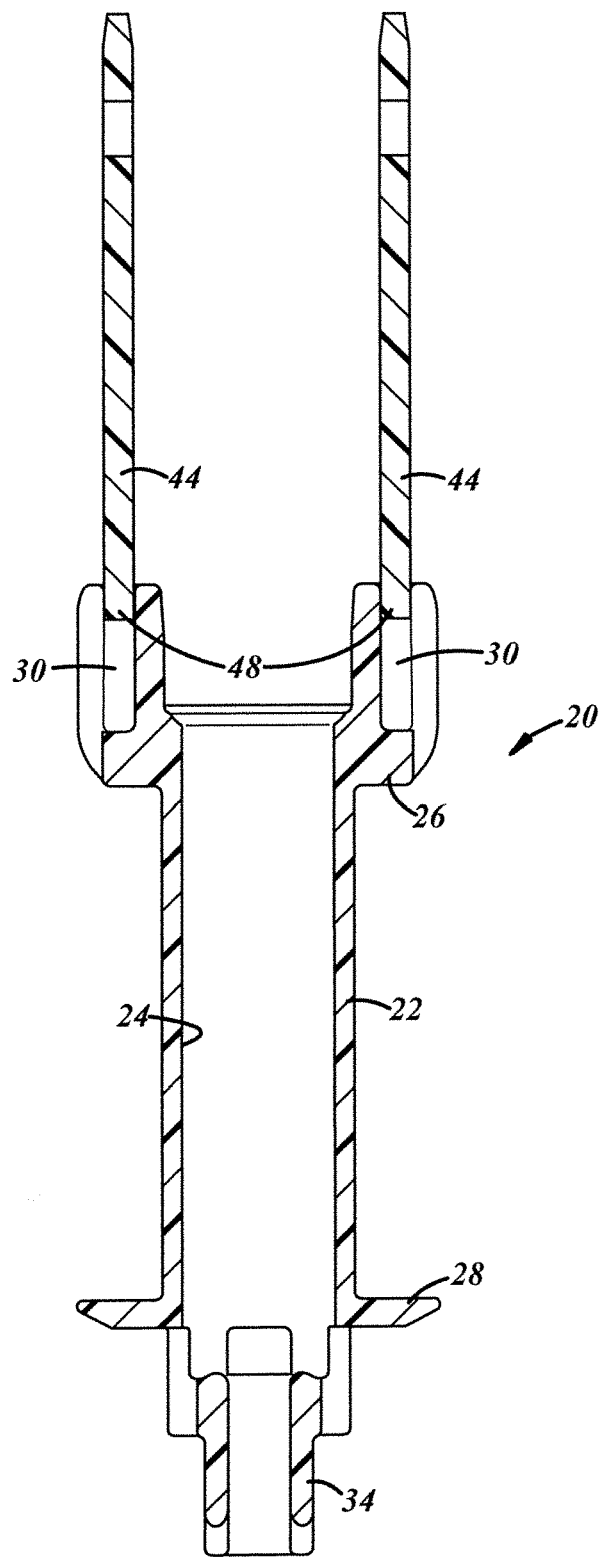
FIG. 4 is a sectional view like FIG. 1 and showing a pair of terminals being inserted into terminal cavities of the bobbin.
Figure 5:
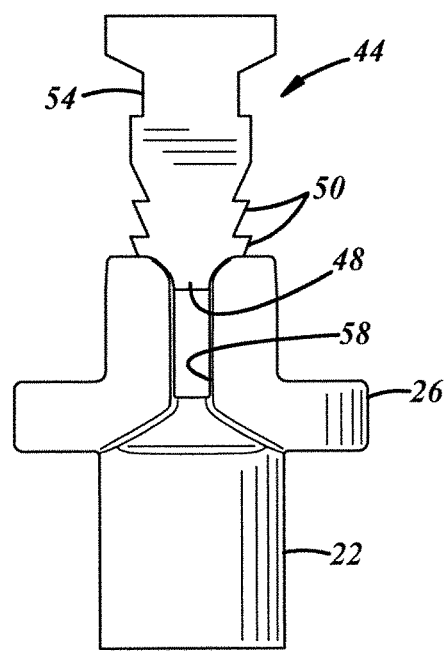
FIG. 5 is a fragmentary side view showing a portion of one terminal and a portion of the bobbin.
Figure 6:
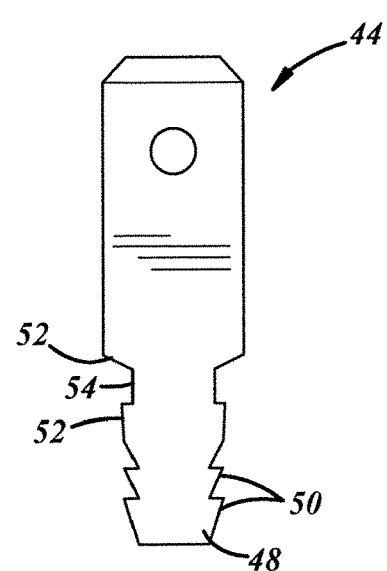
FIG. 6 is a side view of a terminal.
Figure 9:
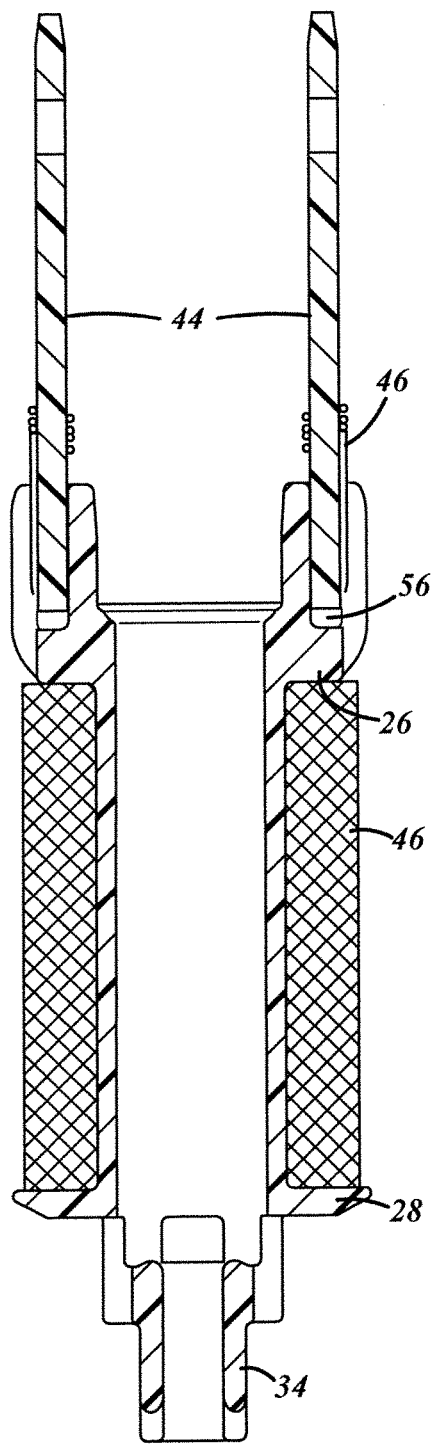
FIG. 9 is a sectional view like FIG. 7 and including a wire coil on the bobbin and connected to the terminals.
Figure 11:
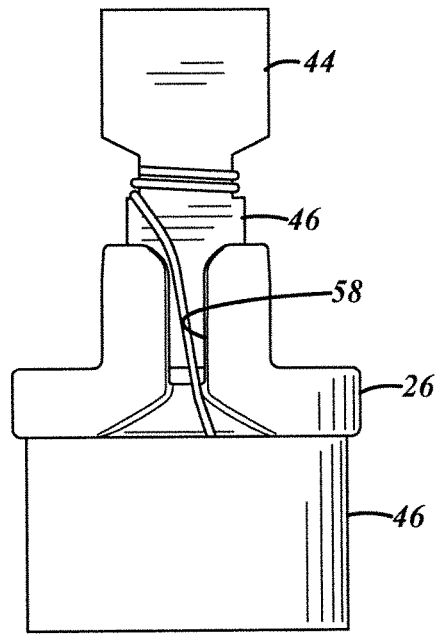

Electrical terminals 44 are provided in the terminal cavities 30, as shown in FIGS. 4 and 5. The terminals 44 are formed from metal, are connected to a wire of the solenoid coil 46 (FIG. 9), and define part of the electrical circuit of the solenoid valve 10. The terminals 44 may be generally thin strips of metal that are pressed into the terminal cavities 30. To retain the terminals 44 in the cavities 30, the insertion end 48 of the terminals 44 and/or the cavities 30 may include a connection feature. As shown in FIGS. 5 and 6, the connection feature includes serrations 50 on the insertion end of the terminals 44, although other connection features may be used in addition to or instead of the serrations 50. The serrations 50, in the embodiment shown, are adapted to dig into the material defining the terminal cavities 30 to firmly retain the terminals in the cavities. Spaced from the insertion end 48, the terminals 44 may include one or more wire retainer features to facilitate retention of the wire 46 on the terminals. In at least some implementations, the wire retainer features may include outwardly extending shoulders 52 spaced apart by a smaller neck 54 about which the wire 46 is wrapped or crimped.

Figure 7:
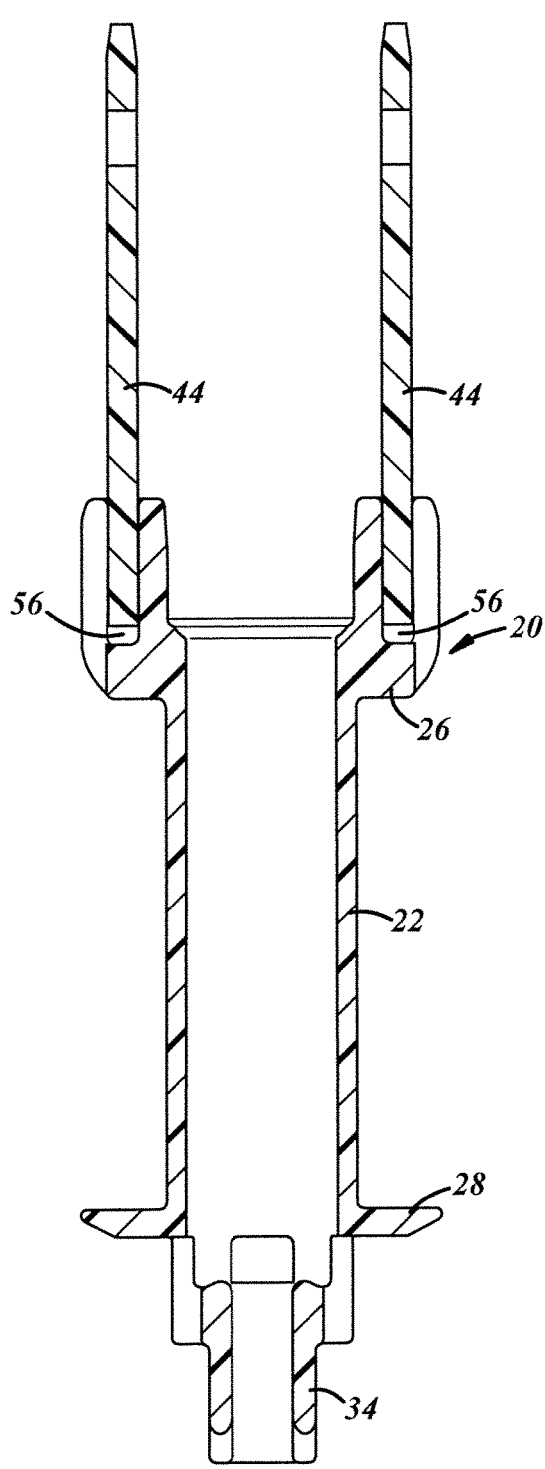
FIG. 7 is a sectional view showing the terminals in a preliminary installation position.
Figure 8:
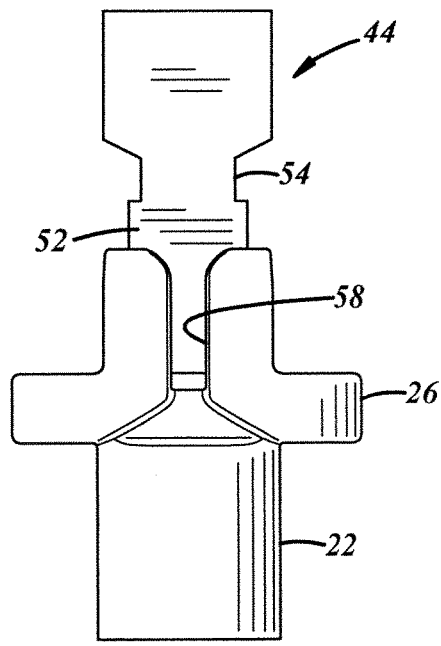
FIG. 8 is a fragmentary view showing a terminal in its preliminary installation position.
Figure 10:
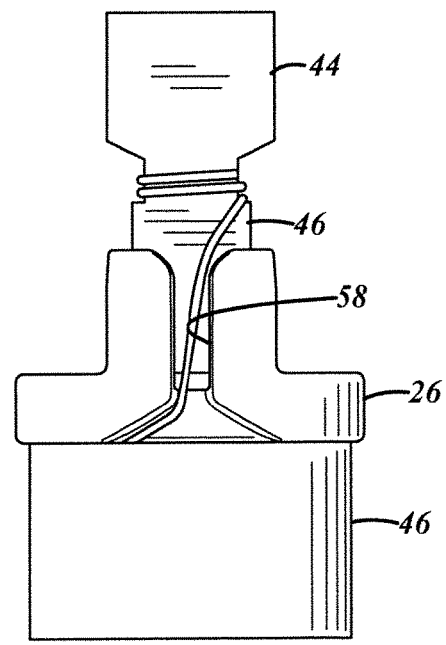
FIGS. 10 and 11 are fragmentary side views showing the wire coil connected to each of the terminals.

As shown in FIGS. 7 and 8, the terminals 44 may be inserted to an initial depth within the cavities 30 that defines a preliminary installation position and leaves a gap 56 between the insertion end 48 of the terminals 44 and a bottom of the cavities 30. The initial depth may be controlled by engagement of a lower one of the shoulders 52 engaging the wall defining the cavities 30, or by some other means.

With the terminals 44 installed to their initial position on the bobbin 20, the wire coil 46 can be provided on the bobbin 20. In one form, the wire coil 46 is provided by tying one end of a wire to one of the terminals 44, winding the wire 46 a desired number of times around the bobbin body 22 between the flanges 26, 28, and then tying off the other end of the wire 46 to the other of the terminals 44. As shown in FIGS. 5, 8, 10 and 11, the terminal cavities 30 may include slots 58 to accommodate the wire 46 between the terminals 44 and the bobbin body 22. The bobbin 20 may be symmetrical such that the wire 46 may be initially wrapped onto either terminal 44. The wire ends may be soldered to the terminals or otherwise connected, as desired.

Figure 13:
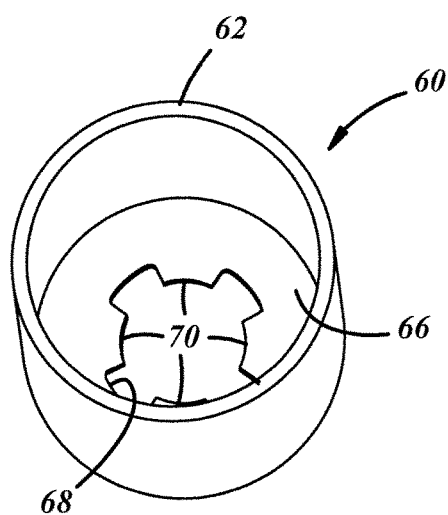
FIGS. 13 and 14 are top and bottom perspective views of the housing.
Figure 12:
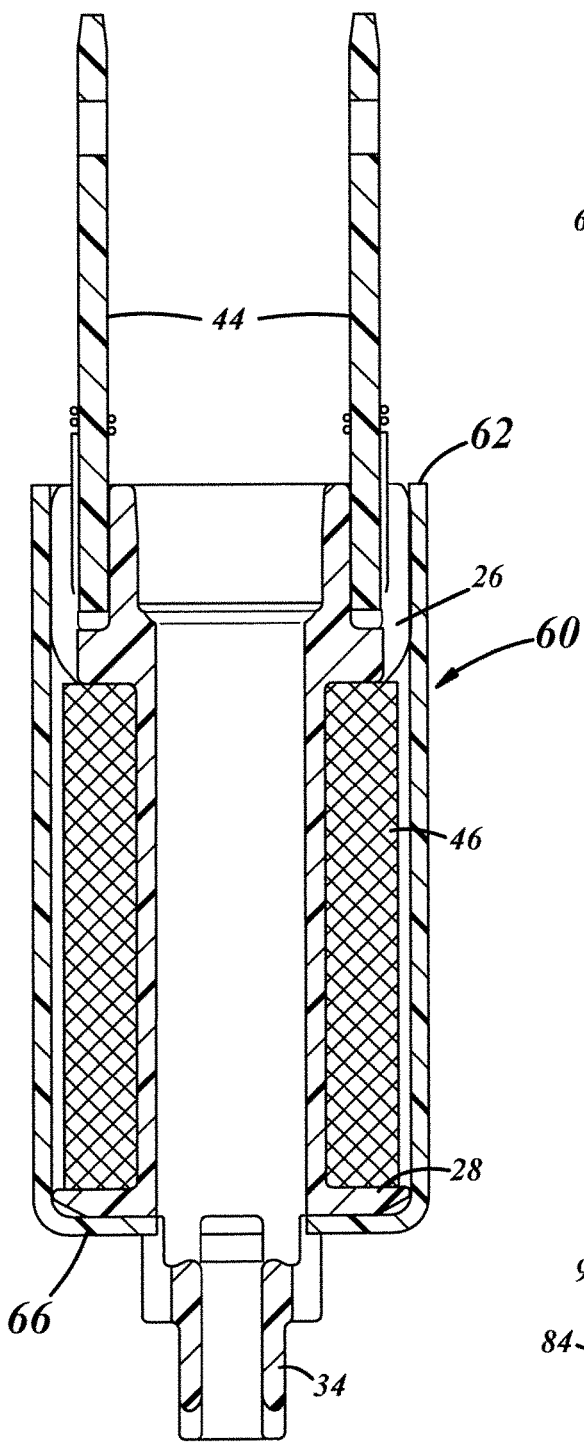
FIG. 12 is a sectional view showing the bobbin received within a housing.
Figure 14:
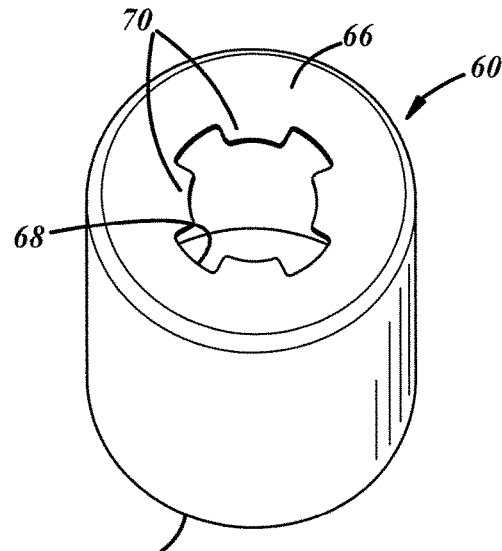

After the wire 46 is provided on the bobbin 20, the bobbin may be inserted into a housing 60, as shown in FIG. 12, with the housing 60 shown in FIGS. 12-14. The housing 60 may be generally cylindrical and open at an upper end 62 that is received adjacent to the terminals 44. To reduce vibrations and/or help retain the bobbin 20 within the housing 60, the bobbin flanges 26, 28 may be relatively closely received within an interior surface 64 of the housing 60, if desired. The lower end of the housing may include and inwardly extending wall 66 with an opening 68 through which the boss 34 extends. Inwardly extending tabs 70 may be received within the outlets 40 formed in the bobbin 20 adjacent to the valve seat 38, and adjacent to the interior passage 24 of the bobbin. While any number of tabs 70 may be provided, as shown, four tabs are provided with one tab 70 extending into each of the outlets 40. The housing 60 may be formed from metal and may define part of the magnetic flux path of the solenoid valve as will be described.

Figure 15:
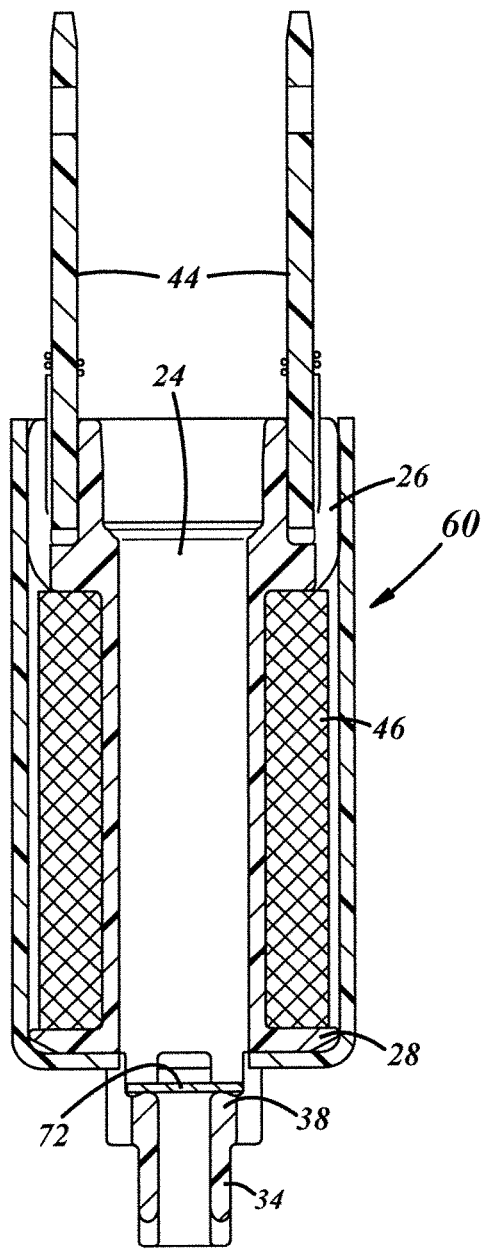
FIG. 15 is a sectional view like FIG. 12 and including a valve member.

To improve the sealing/closing of the valve seat 38 when desired, as shown in FIG. 15, a valve member 72 may be provided within the bobbin's internal passage 24, adjacent to the valve seat 38. The valve member 72 may be formed from any suitable material and may be generally circular and sized for receipt in the internal passage 24 and to engage and close the valve seat 38. The valve member 72 may be independently received within the internal passage 24 such that it can move independently of and is not directly connected to another component. In this manner, it may act as a check valve to prevent reverse flow from the outlet(s) to the inlet and it may improve closing and sealing of the valve seat 38 as will be described further.

Figure 16:
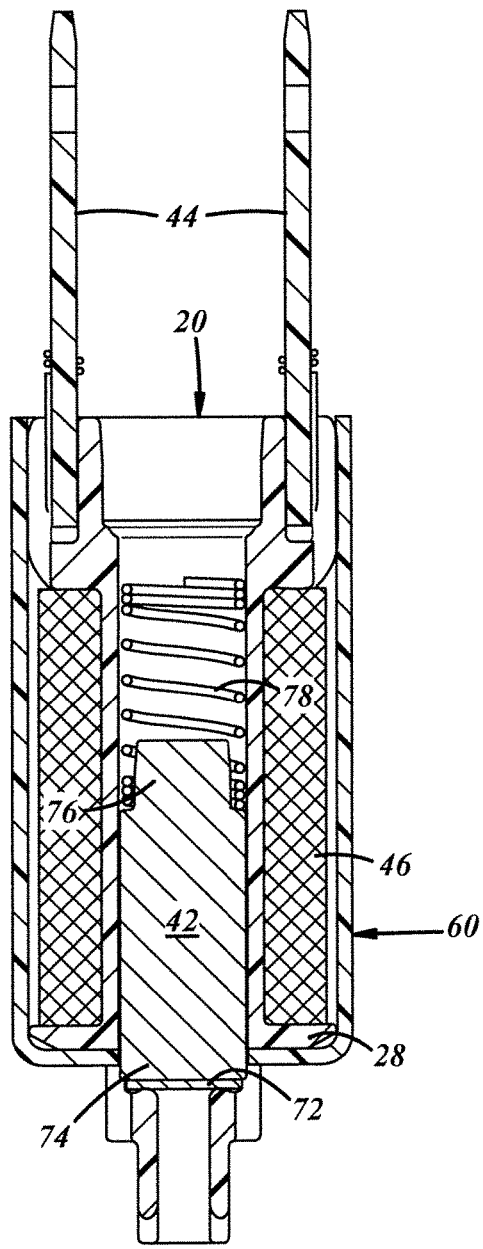
FIG. 16 is a sectional view like FIG. 15 and including an armature an a biasing member for the armature.

Next, as shown in FIG. 16, the armature 42 may be inserted into the bobbin internal passage 24 with one end 74 adjacent to the valve member 72 and/or valve seat 38 and the opposite end 76 within the bobbin body 22 and surrounded by the solenoid coil 46. The armature 42 may be ferromagnetic and is slidably received within the internal passage 24 so that it may move relative to the valve seat 38 as will be described. A biasing member, such as a spring 78 may be received within the internal passage 24 and have one end engaged with the armature 42, which may have a reduced diameter at end 76 over which a portion of the spring 78 is received. The spring 78 biases the armature 42 into engagement with the valve member 72 so that the valve 10 is normally closed. That is, unless the armature 42 is moved away from the valve member 72 by an magnetic force generated by the solenoid, the spring 78 urges the armature 42 into the valve member 72 which engages and closes the valve seat 38 to inhibit or prevent fluid flow through the valve seat 38.

Figure 18:
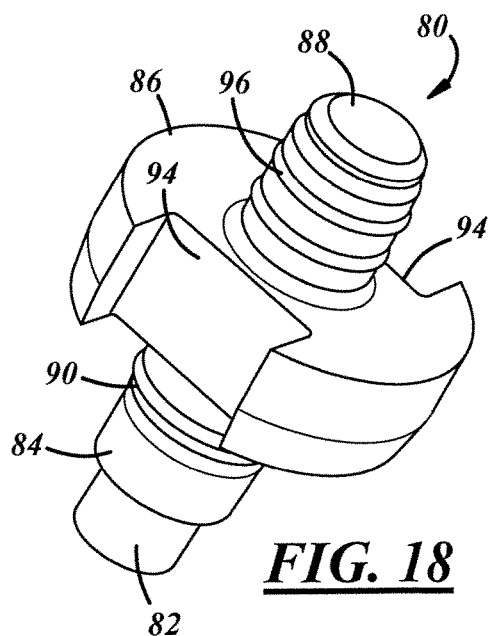
FIG. 18 is a perspective view of the armature stop.
Figure 17:
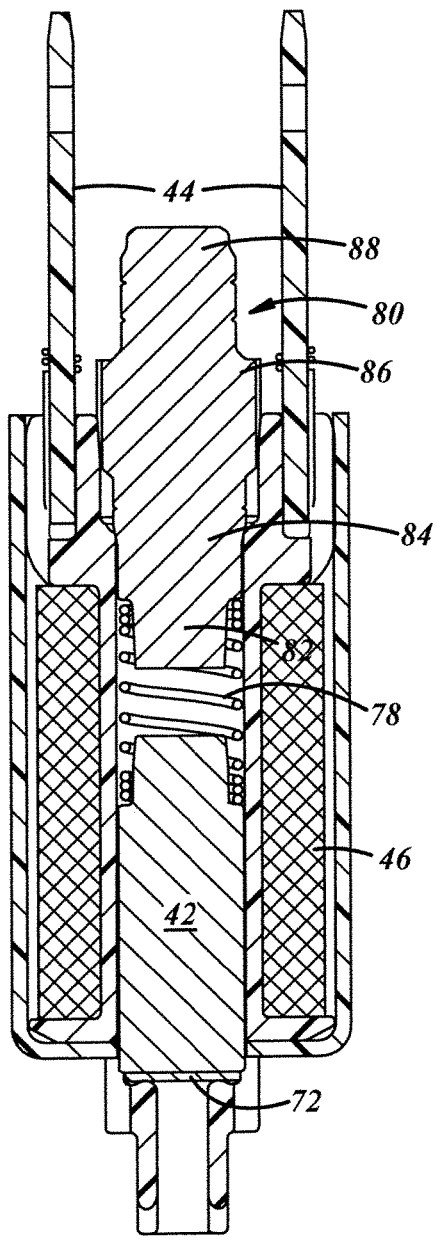
FIG. 17 is a sectional view like FIG. 16 and including an armature stop.

As shown in FIG. 17, an armature stop 80 is provided in the open end of the bobbin 20 to close the open end, provide a reaction surface for the spring 78 and a stop surface that may be engaged by the armature 42 to limit its travel. As shown in FIGS. 17 and 18, the armature stop 80 may include a spring retention feature, such as a reduced diameter nose 82 at one end, a stem 84 closely received against the bobbin in the internal passage 24, an outwardly extending head 86 and a protruding cylindrical boss 88. The stem 84 may include retention features, such as outwardly extending barbs 90, to engage the bobbin 20 within the internal passage 24 to firmly retain the final assembled position of the armature stop 80. At the point of the assembly shown in FIG. 17, the armature stop 80 may be only partially pressed into the bobbin 20 with a lower end of the head 86 still spaced from an internal shoulder 92 of the bobbin 20. The head 86 may be generally cylindrical, designed to substantially close the open end of the bobbin 20 and may include recesses 94 to accommodate the terminal cavities 30. The boss 88 may include outwardly extending barbs 96 or other retention features for a cap that may be installed over the open end of the housing 60, bobbin 20 and over the armature stop 80. The adjacent end of the armature stop 80 may be engaged by the armature 42 and provide a positive stop or limit to the armature movement.

Figure 19:
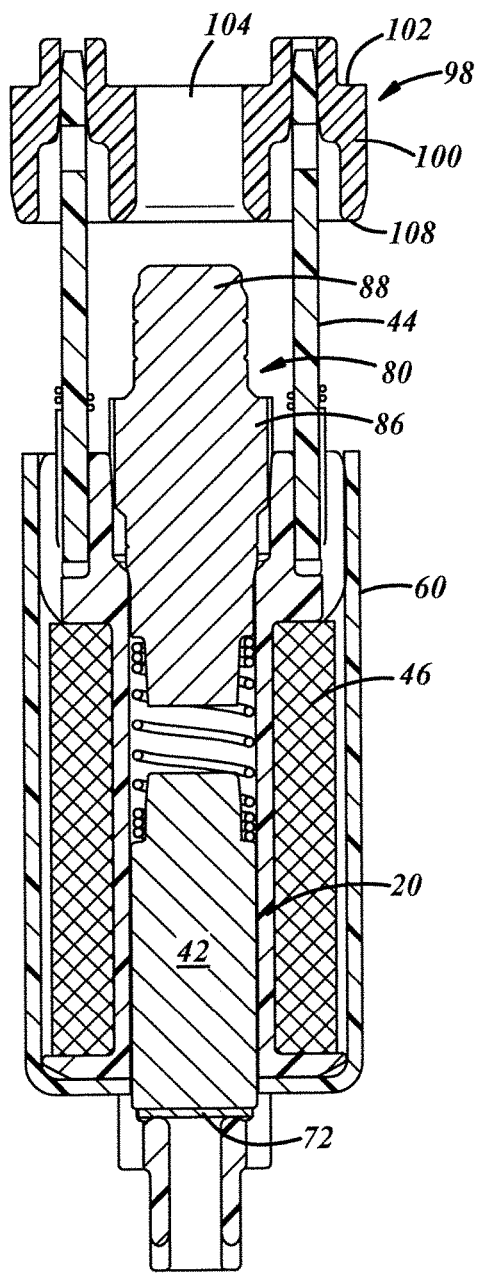
FIG. 19 is a sectional view like FIG. 17 and including a cap.
Figure 20:
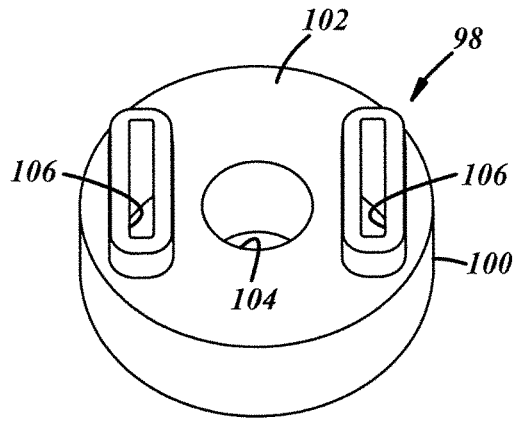
FIGS. 20 and 21 are top and bottom perspective views of the cap.
Figure 21:
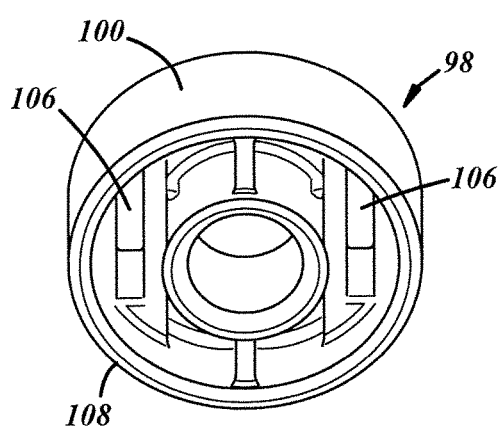

FIGS. 19-21 illustrate the cap 98 and its assembly onto the solenoid housing 60, armature stop 80 and bobbin 20. The cap 98 may have a generally cylindrical sidewall 100 leading to an upper wall 102. The upper wall 102 may include an opening 104 that receives the armature stop boss 88, and a pair of slots 106 through which the terminals 44 extend when the cap 98 is inserted onto the terminals 44 and pressed into its assembled position. If desired, as the cap 98 is installed to its final position, the cap 98 may engage the head 86 of the armature stop 80 and drive the armature stop to its final position, shown in FIG. 22. In this position, the armature stop 80 is engaged with the bobbin 20 within its internal passage 24 and the head 86 is trapped between the bobbin 20 and cap 98. This movement of the armature stop 80 may compress the spring 78 between the armature stop 80 and armature 42 to provide a desired spring force acting on the armature. A lower edge 108 of the cap sidewall 100 may be pressed flush against the open end of the housing 60 to provide a positive stop for the cap 98 that may be visually verified. Of course, the cap sidewall 100 could be received over or within the housing 60, if desired. The cap 98 may provide a dust/contaminant shield for the soldered wire-to-terminal connection, and the solenoids internal components generally. The cap 98 may provide support for the terminals 44 so that they are less likely to be unduly flexed and or displaced from their cavities 30. And the cap 98 may help retain the solenoid valve 10 within a cavity 110 in which the solenoid valve 10 is received, for example, as shown in FIG. 26.

Figure 22:
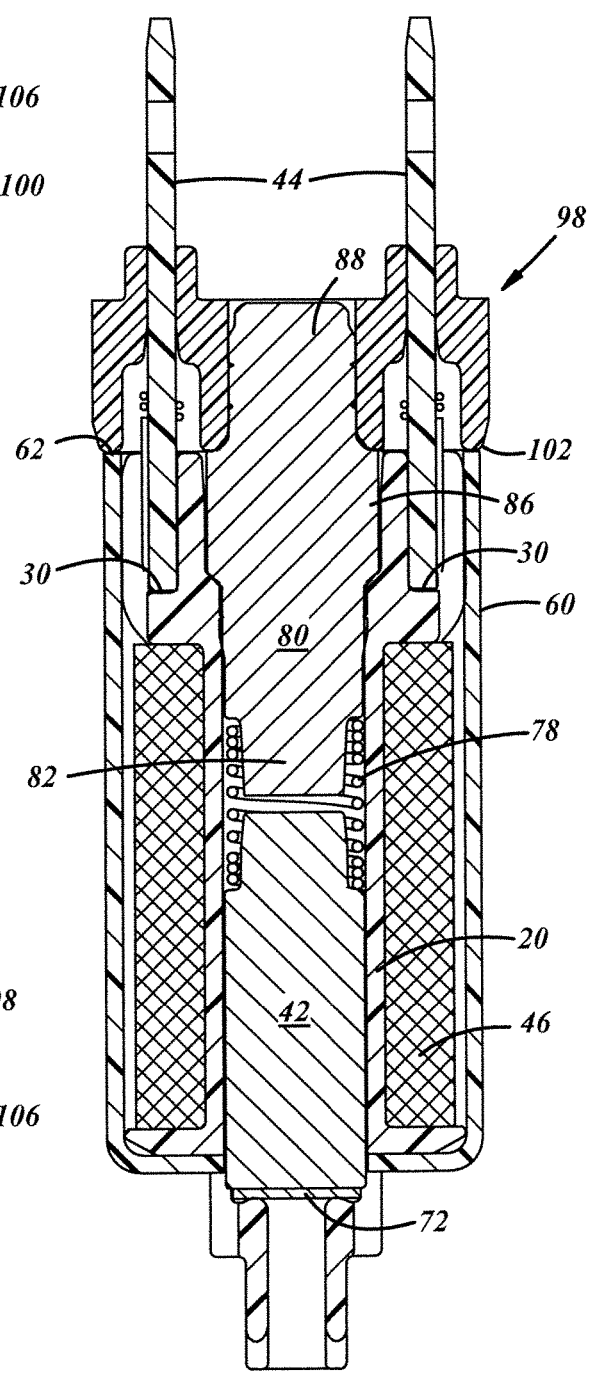
FIG. 22 is a sectional view like FIG. 19 illustrating a final assembled position of the components of the solenoid valve.

In the implementation shown, the final assembly step is to move the terminals 44 from their initial position to their final assembled position shown in FIG. 22. This can be done by simply pressing the terminals 44 further into their cavities 30, and may be done at the same time the cap 98 is installed. This movement of the terminals 44 may provide some slack in the solenoid coil wire 46 to create some stress relief for the wire 46 and ensure that it is not stretched or unduly taut in use. This reduces the likelihood that the wire may break and cause failure of the solenoid. This later provided stress relief may also permit the wire to be wound around the bobbin 20 and connected to the terminals 44 without having to provide slack at that time, and this may simplify the wire winding process.

Figure 23:
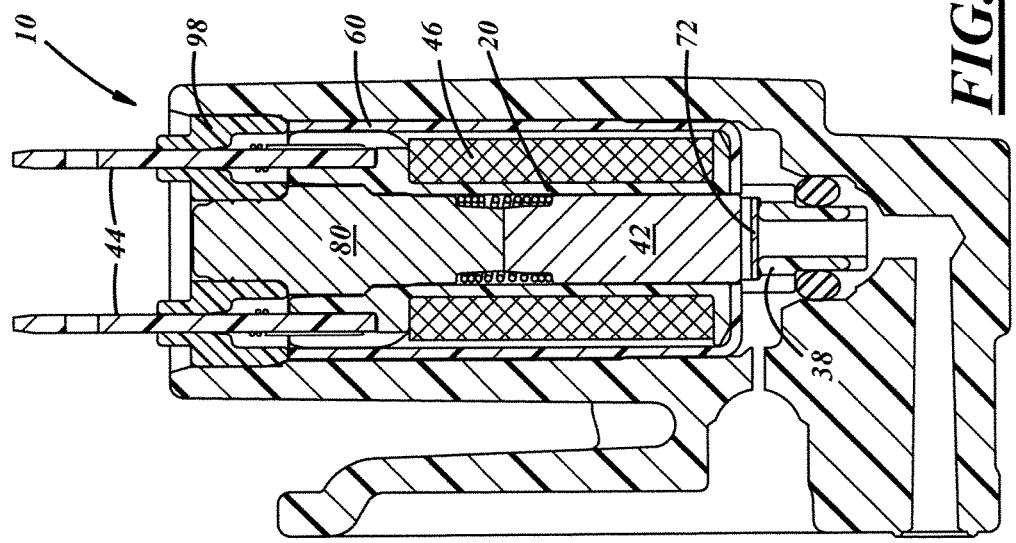
FIG. 23 illustrates the armature in its open position.
Figure 24:
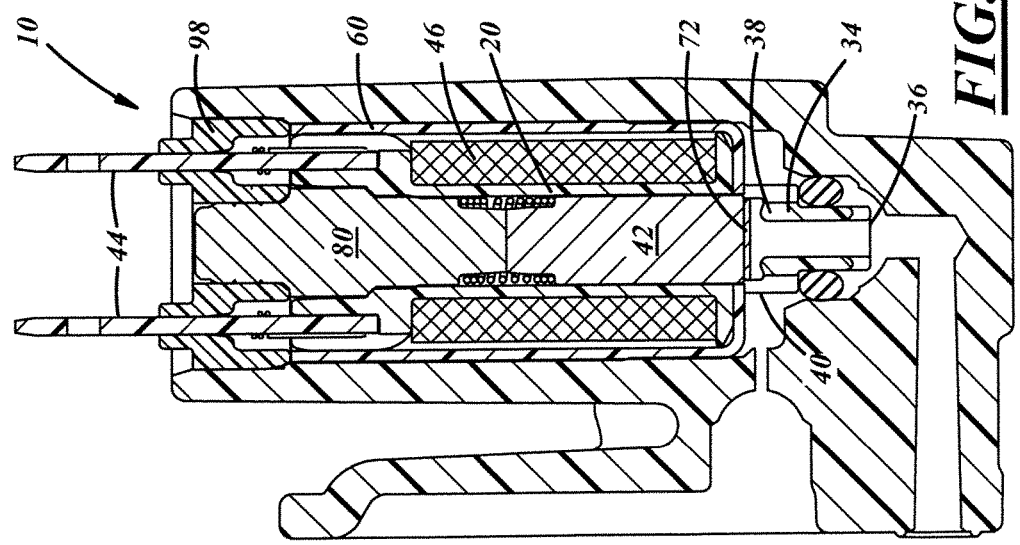
FIG. 24 illustrates the armature in its open position and the valve member against the valve seat.

In use, when electricity is supplied to the terminals 44, the wire coil 46 generates a magnetic field that displaces the armature 42 against the spring 78 and into engagement with the armature stop 42, as shown in FIG. 23. This permits the valve member 72 to be moved away from the valve seat 38 by fluid flow through the inlet 36 and toward the outlet(s) 40. However, the reverse flow of fluid may be prevented by the valve member 72, as shown in FIG. 24, even if the armature 42 is in its open position as such reverse fluid flow engages the valve member 72 and moves it onto the valve seat 38 to close the valve seat. When electricity is not supplied to the terminals 44, the armature 42 is returned to its closed position by the spring 78 and fluid flow through the valve seat 38 is inhibited or prevented by engagement of the valve member 72 with the valve seat 38.

Figure 25:
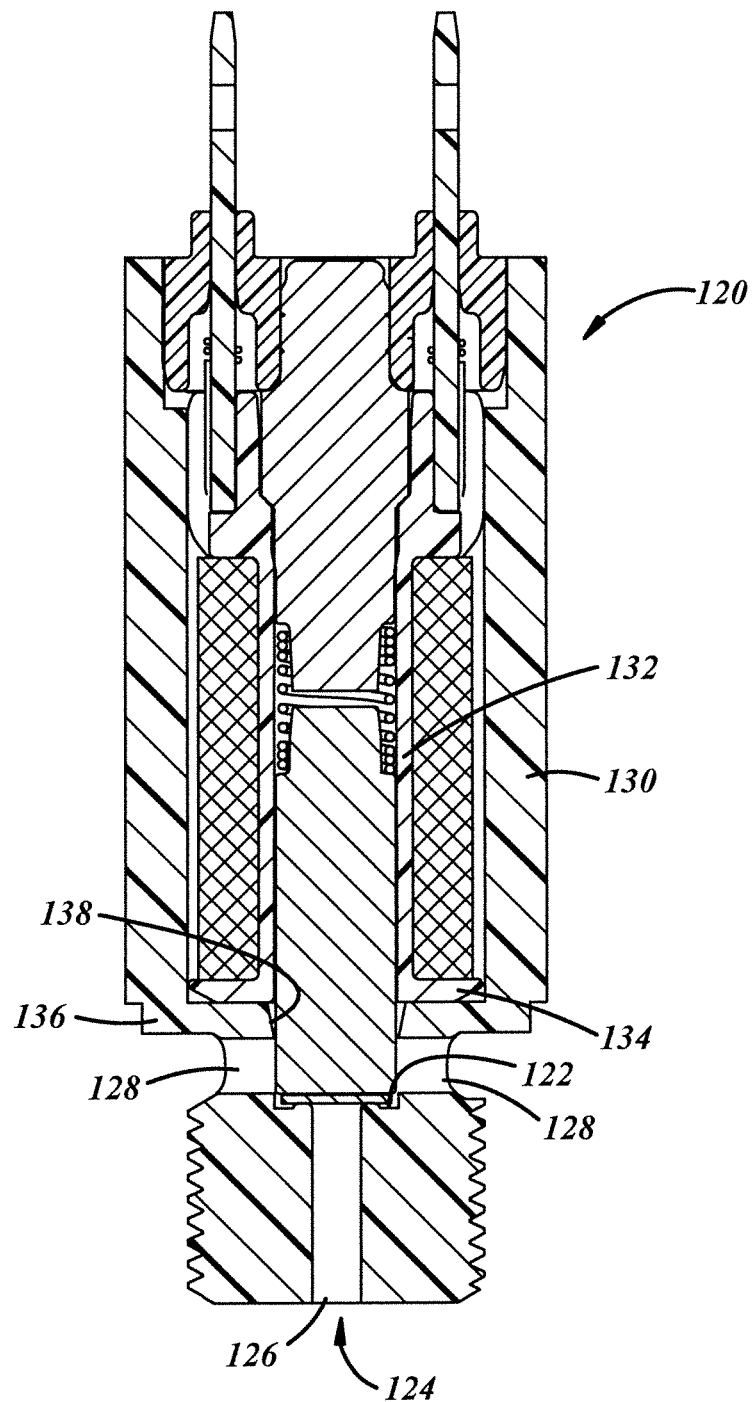
FIG. 25 illustrates an alternate solenoid valve.

An alternate solenoid valve 120 is shown in FIG. 25. This solenoid valve 120 may be the same as that previously described except as noted below. In this solenoid valve 120, the valve seat 122 and fluid passage 124, including inlet 126 and outlet(s) 128 are formed in the housing 130 rather than the bobbin 132. Hence, the bobbin 132 may terminate at its lower flange 134 and not include the boss 34 as in the prior embodiment. The housing 130 may include an inwardly extending wall 136 against which the bobbin 132 is received. The wall 136 has an opening 138 through which the armature 42 extends, and this provides the housing 130 in close proximity to the armature 42 so that the housing 130 may complete the magnetic flux path as previously described. Otherwise, the construction and operation of this solenoid valve 120 may be the same as described and shown for the other solenoid valve 10.

By forming the valve seat 38, 122 integral with the bobbin 20 and/or the housing 130, rather than as a separate and additional component, the tolerances can be reduced and tolerance stack-up between multiple components eliminated. Further, the integral valve seat 38, 122 and fluid flow paths 32, 124 in the bobbin 20 or housing 130 enable a portion of the housing 60, 130 (e.g. the lower wall and/or its tabs) to be received close to the armature 42 such that the housing itself (rather than separate washers or rings) can complete the magnetic flux path to the armature. Enabling precise location of the tabs 70 or other portion of the housing 60, 130 in close proximity to the armature 42 without interference with the armature 42 also enables the current required to operate the solenoid valve 10, 120 to be reduced compared to similar solenoids. This reduced the cost to operate the solenoid valve 10, 120 and facilitates use of the solenoid valve with devices that do not have ready supplies of electrical power, such as devices powered by small engines that do not have a battery or alternator. The open-ended bobbin 20, 132 and housing 60, 130 are designed so that the remaining components can all be inserted from the same end providing a so-called drop-in or top-down installation. And the components can be moved to their final assembled positions by a single pressing operation that moves, for example, the armature stop 80, cap 98 and terminals 44 to their final assembled positions providing for a simple and low cost assembly.

Certain components may also provide more than one function, to improve the efficiency of the solenoid valve 10, 120. For example, the valve member 72 may act as a valve seal and a check valve, as noted above which eliminates the cost and tolerance stack-up that would be associated with an additional check valve. The armature stop 80 may provide a stop surface to limit movement of the armature 42 away from the valve seat, a retainer for the armature and spring by way of its friction or interference fit within the bobbin internal passage 24, and also a retainer for the cap 98 by way of the retention barbs on the boss. This may reduce the interference between the components and the force needed to press the components to their final assembled position which could otherwise deform the bobbin and potentially break the wire causing failure of the solenoid.

Figure 27:
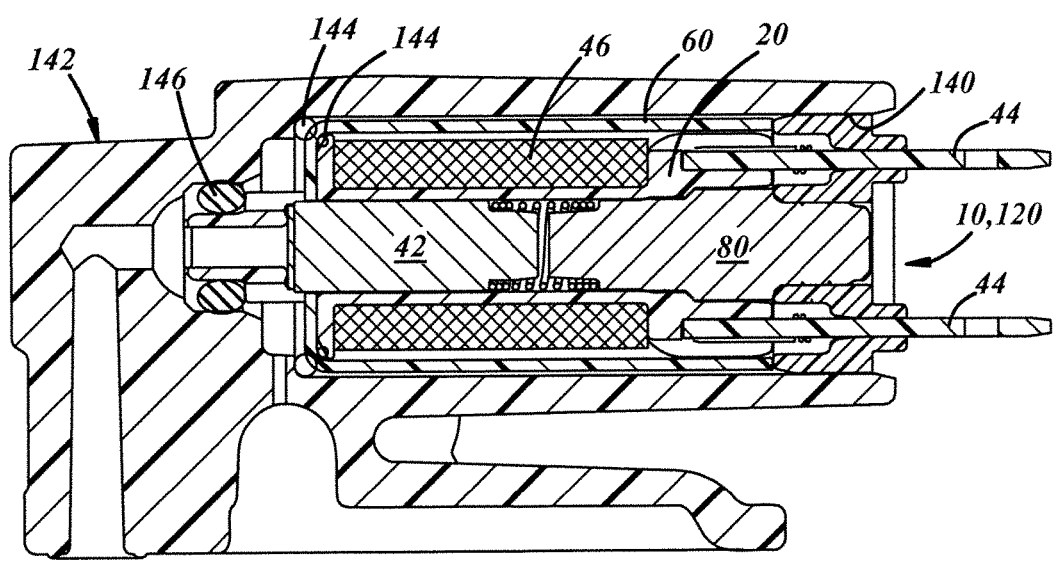
FIG. 27 illustrates a solenoid carried by a device with additional seals provided.

FIG. 27 illustrates additional sealing that may be provided when the solenoid valve 10 or 120 is inserted into a cavity 140 of a device 142. Seals, such as o-rings 144 may be provided between the bobbin 20 and the housing 60 and/or between the housing 60 and the device 142 within the cavity 140. A further seal 146 may be provided between the bobbin boss 34 and the device 142. And these seals may be in addition to seals provided by the interference fit between the armature stop 80 and the bobbin 20, and the cap 98 and armature stop 80. Further, the cap 98 may have an outer diameter that is larger than the inner diameter of the cavity 140 to provide a press or interference fit between the cap 98 and device 142 within the cavity 140.

It will of course be understood that the foregoing description is of preferred exemplary embodiments of the invention and that the invention is not limited to the specific embodiments shown. Various changes and modifications will become apparent to those skilled in the art and all such variations and modifications are intended to come within the spirit and scope of the appended claims.

The invention claimed is:

1. A solenoid valve, comprising:
   a housing;
   a bobbin received at least partially within the housing and having a body about which a coil is provided;
   a fluid flow path including an inlet and an outlet and a valve seat defined by the bobbin; and
   an armature moveable relative to the valve seat to control flow through the fluid flow path wherein the housing has an open end and an inwardly extending wall spaced from the open end to retain the bobbin, and wherein the bobbin defines at least one outlet downstream of the valve seat and through which fluid flows, and wherein the inwardly extending wall includes a portion received within said at least one outlet of the bobbin.

2. The valve of claim 1 wherein the bobbin includes an internal passage that is open at one end, and the valve seat is defined by a reduced diameter portion that is smaller than and faces the internal passage.

3. The valve of claim 2 wherein the reduced diameter portion is formed from the same piece of material as the portion of the bobbin that defines the internal passage.

4. The valve of claim 2 wherein the bobbin or the housing includes an outlet downstream of the valve seat, and wherein the armature is movable relative to the valve seat between a closed position wherein fluid flow through the valve seat is inhibited or prevented and an open position wherein fluid flow through the valve seat is permitted.

5. The valve of claim 2 wherein the armature is larger than the valve seat and is received in the internal passage through the open end of the internal passage.

6. The valve of claim 4 which also includes an armature stop received at least in part in the internal passage and adapted to be engaged by the armature to limit movement of the armature away from the valve seat.

7. The valve of claim 6 which also includes a biasing member located at least partially between the armature and the armature stop.

8. The valve of claim 2 wherein the valve seat is located closer to the inwardly extending wall than the open end of the housing and the open end of the internal passage is located closer to the open end of the housing than the valve seat.

9. The valve of claim 6 which also includes at least one terminal, and the bobbin, armature, armature stop and terminal are moved into their final assembled position in the same direction.

10. The valve of claim 1 wherein the housing includes a portion received in close proximity to the armature so that the housing forms part of the magnetic flux path for the armature.

11. The valve of claim 10 wherein part of the housing extends into the fluid flow path and adjacent to the valve seat.

12. The valve of claim 2 which also includes a valve member located between the armature and the valve seat.

13. The valve of claim 4 which also includes a valve member located between the armature and the valve seat and movable independently of the armature so that the valve member inhibits or prevents the flow of fluid from the outlet through the valve seat even when the armature is in the open position.

14. The valve of claim 9 which also includes a wire connected to the terminal and defining a coil around the bobbin, and wherein the wire includes slack and is not taut between the terminal and the coil.

15. The valve of claim 1 wherein the inwardly extending wall includes an opening through which the armature extends at least when the armature is in its closed position.

16. The valve of claim 1 wherein the inwardly extending wall includes at least one tab received within said at least one outlet of the bobbin.

17. The valve of claim 1 wherein the bobbin is engaged with the inwardly extending wall, and wherein the inwardly extending wall includes an opening through which the armature extends without anything between the inwardly extending wall and the armature.

18. The valve of claim 1 wherein the inwardly extending wall includes an opening through which the armature extends without a portion of the bobbin received radially between the opening in the inwardly extending wall and the armature.

* * * * *